United States Patent
Coran et al.

(10) Patent No.: US 6,767,203 B2
(45) Date of Patent: Jul. 27, 2004

(54) HORIZONTAL-AXIS REVOLVING-TURRET PLANT FOR HANDLING PREFORMS

(75) Inventors: Massimo Coran, Spresiano (IT); Matteo Zoppas, Fontanafredda (IT)

(73) Assignee: Sipa S.p.A., Vittorio Veneto (IT)

( * ) Notice: Subject to any disclaimer, the term of this patent is extended or adjusted under 35 U.S.C. 154(b) by 46 days.

(21) Appl. No.: 10/181,032

(22) PCT Filed: Nov. 29, 2000

(86) PCT No.: PCT/EP00/11935

§ 371 (c)(1),
(2), (4) Date: Jul. 12, 2002

(87) PCT Pub. No.: WO01/54883

PCT Pub. Date: Aug. 2, 2001

(65) Prior Publication Data

US 2003/0003187 A1 Jan. 2, 2003

(30) Foreign Application Priority Data

Jan. 26, 2000 (IT) .................................. PN2000A0006

(51) Int. Cl.$^7$ .............................................. B29C 49/06
(52) U.S. Cl. ..................................... 425/534; 425/556
(58) Field of Search ................................ 425/526, 556, 425/547, 534

(56) References Cited

U.S. PATENT DOCUMENTS

| 4,313,905 | A | | 2/1982 | Hafele |
| 4,929,450 | A | | 5/1990 | Takakusaki et al. |
| 5,582,788 | A | | 12/1996 | Krishnakumar et al. |
| 5,772,951 | A | * | 6/1998 | Coxhead et al. ............ 425/526 |
| 6,143,225 | A | * | 11/2000 | Domodossola et al. ..... 425/547 |
| 6,223,541 | B1 | * | 5/2001 | Farrag ........................ 425/548 |
| 6,451,556 | B1 | * | 9/2002 | Kallender et al. .......... 425/547 |

* cited by examiner

*Primary Examiner*—Tim Heitbrink
(74) *Attorney, Agent, or Firm*—Wenderoth, Lind & Ponack, L.L.P.

(57) ABSTRACT

A plant for cooling preforms has a collection and translation element provided with a plurality of receptacles adapted to accommodate respective preforms that are usually knocked out of an injection mould. A revolving-turret element has two opposite surfaces provided with a plurality of cups adapted to accommodate respective performs. The turret revolves in a controlled manner about a horizontal axis so as to successively orientate the two surfaces upwards and downwards, and the collection and translation element can be displaced with a translational motion from a preform loading position selectively to a plurality of distinct positions, which lie above the surfaces of the turret when rotated upwards, and can engage and release the preforms from the respective receptacles.

20 Claims, 21 Drawing Sheets

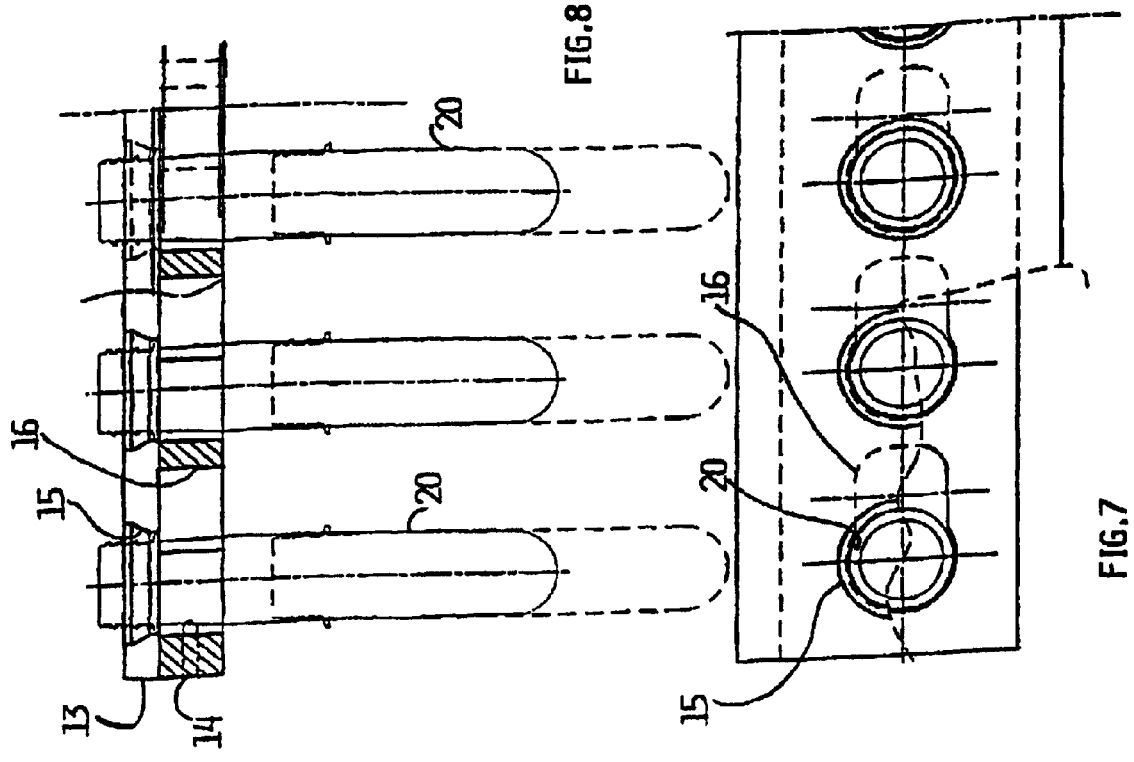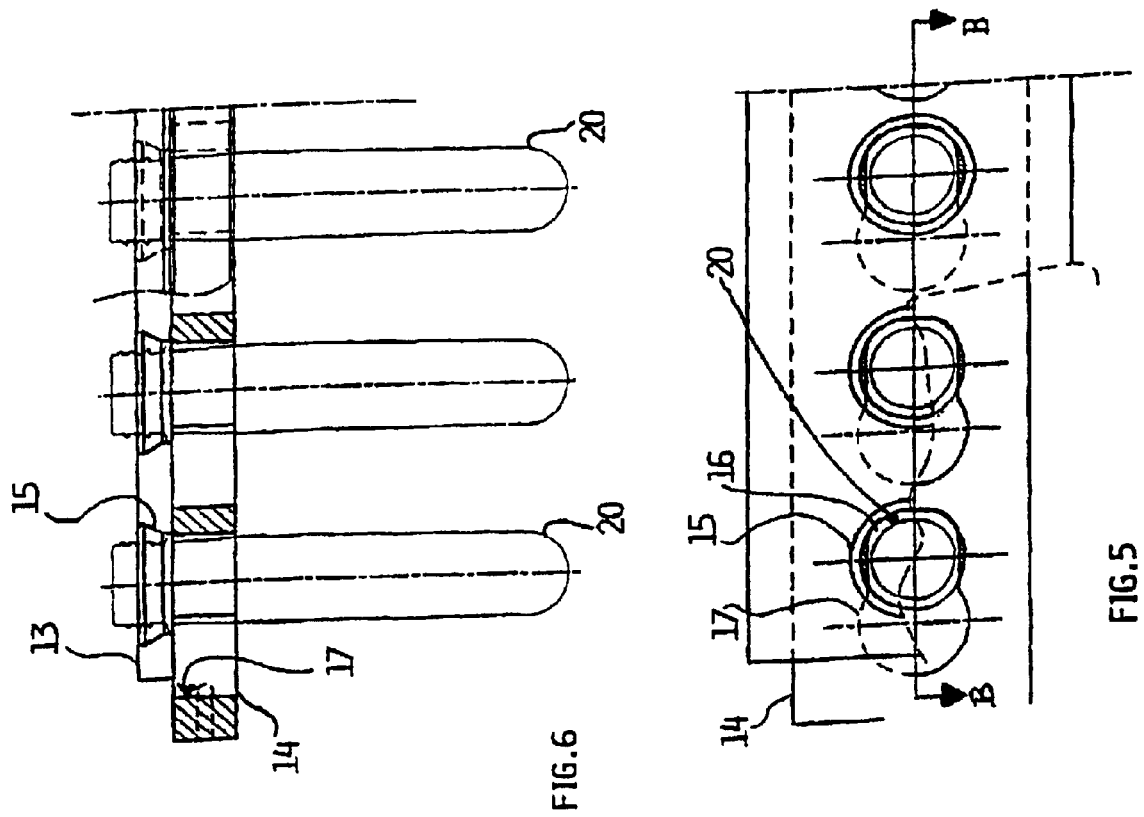

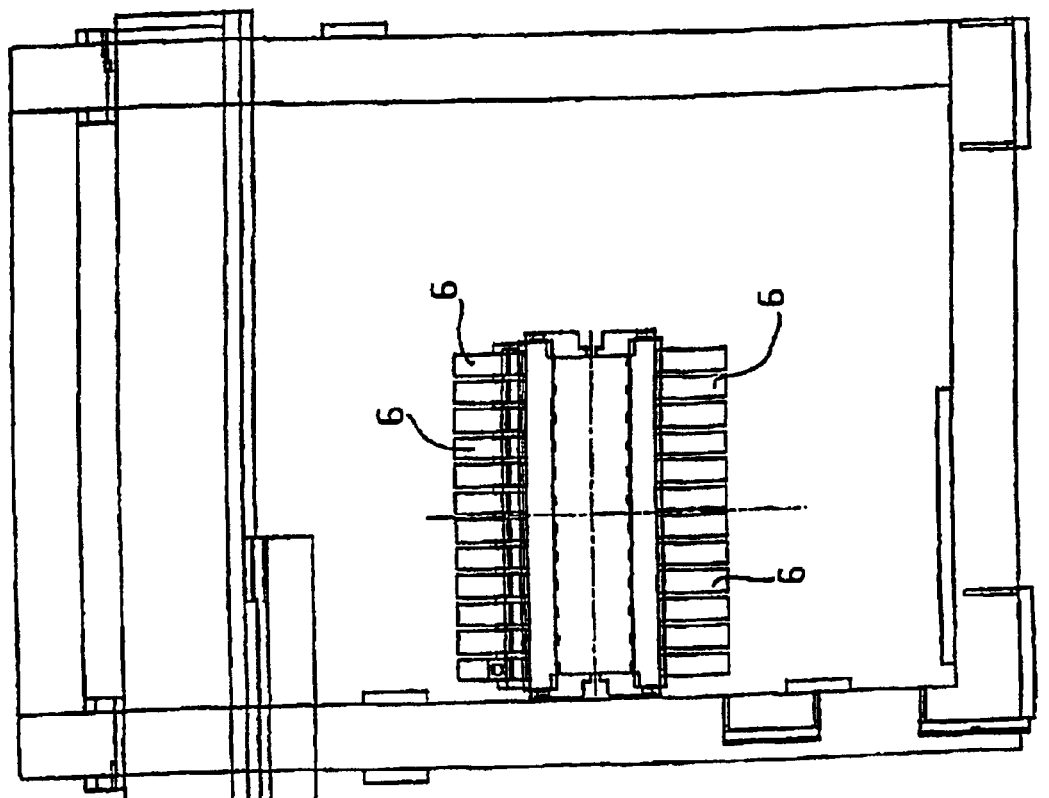
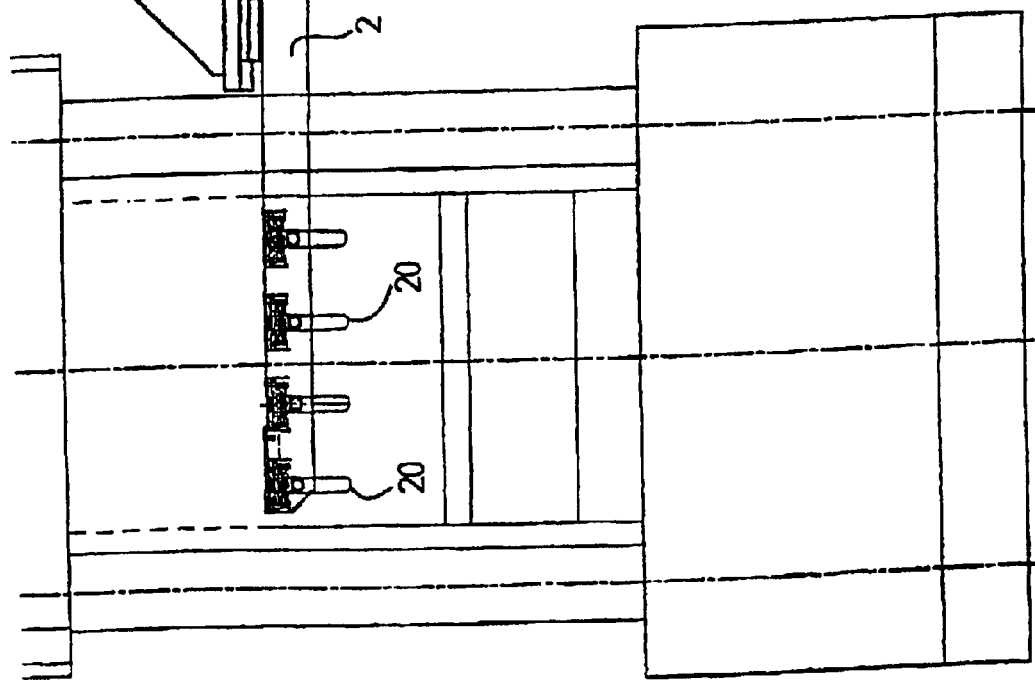
FIG. 10

HORIZONTAL-AXIS REVOLVING-TURRET PLANT FOR HANDLING PREFORMS

BACKGROUND OF THE INVENTION (1) Field of the Invention

The present invention refers to a high-output, high-productivity plant for the production of plastic items, i.e. so-called "preforms", and in particular the present invention applies in a preferred manner to machines adapted for moulding at the same time a plurality of such so-called "preforms" that are intended for processing by blow moulding into appropriate final containers, especially plastic bottles.

These machines for the final moulding or blow-moulding of preforms are usually defined as "single-step machines" since they are adapted to carry out, in a continuous and automatic manner, the entire process for converting the plastic material from the pelletized state thereof into the finished product, ie. the final containers.

However, it will be appreciated that the present invention shall be understood as applying also to other kinds of machines intended to only produced finished, but not blow-moulded, preforms, since the teaching of the present invention is only aimed at increasing the productivity of the plants and the related preform production processes, regardless of whether these preforms are actually produced in a single-step plant or in a plant intended exclusively for the production of preforms.

(2) State of the Art

The difference existing between single-step and two-step machines is well-known to all those skilled in the art, so that it shall not be described or explained here any further.

It is generally known that the production of preforms involves the simultaneous utilization of a plurality of injection-moulding cavities, into which a flow of resin in its molten state is injected and which remain then closed for a given period of time as required to allow the performs, so formed in the mould cavities, to appropriately cool down and, therefore, solidify. During this phase of cooling down and solidification of the preforms, the related injection moulds remain of course clamped and occupied, i.e. not available for further use, so as to allow for such a cooling down, and they cannot therefore be used for subsequent phases of injection and cooling down of further clusters of preforms. Since the various process phases that are carried out by the plant must be performed in synchrony, each one of them must be carried out within the time interval needed by the longest phase, which usually determines the so-called "cycle time".

It is also a generally well-known fact that such a phase, which includes the steps of:
  closing or clamping the moulds,
  injecting the molten resin into the same moulds,
  cooling down the injected resin and consolidating the respective preforms,
  opening the moulds and
  removing or knocking out the preforms from the moulds,
takes time, i.e. has a duration that is far longer than that of the other process phases carried out by the plant and, as a result, it is decisive in view of determining said cycle time and, therefore, it directly affects the actual productivity of the plant. Such a complete phase, however, can be appropriately broken down into its various, distinct sub-phases, each one of which is active, i.e. goes on for a determined respective sub-period of time.

Also generally well-known is the fact that the longest sub-period of time of the sub-phases is the one used for cooling down the preforms after the consolidation thereof. It therefore is just natural for the complete phase to be divided into an orderly sequence of several sub-phases, which the preform cooling-down sub-phase following the preform consolidation phase belongs to. This of course enables a reduction in the original cycle time to be obtained, which in this way becomes the cycle time relating to the cooling-down sub-phase. Such a solution is well-known in the art, e.g. in the disclosure of U.S. Pat. No. 4,382,905 to Valyi, and has been successively improved in a number of following patents.

However, the increasing pressure exerted in view of bringing about a further increase in the productivity of the injection moulds, along with the fact that such a cooling-down time, and therefore also the related cycle time, is anyway too long in view of the actual possibility of obtaining a satisfactory increase in productivity, has made it appropriate for the opportunity to be considered for such a preform cooling-down sub-phase following the preform consolidation to be in turn subdivided into a plurality of elementary phases. These of course need and take correspondingly reduced time lengths, with the result of a reduction in the cycle time and a corresponding increase in productivity.

However, the various attempts made in view of dividing the preform cooling-down phase by transferring the preforms from a proper mould to a succession of moulds, in which the temperature of the preforms is gradually reduced and brought down to a balanced state, have up to now failed to find any practical implementation owing to a number of reasons. These reasons are in particular the complexity of the plant that would be required for this purpose, the considerable increase in the overall size and space requirements that would ensue therefrom and, under certain circumstances, also the fact that continuously handling still relatively hot preforms from a mould to another one all along a whole sequence of moulds is quite likely to bring about a reduction in the quality of the preforms themselves and, anyway, to more or less significantly damage them.

OBJECT OF THE INVENTION

Based on the above considerations, it is therefore desirable, and it is actually a main purpose of the present invention, to provide a plant and a respective process which are adapted to implement and carry out a preform cooling-down phase under a sensible reduction in the length of the original cycle time, are capable of doing away with the above described drawbacks, and are reliable and capable of being easily implemented using readily available and, therefore, cost-effective materials and techniques.

Such an aim of the present invention, along with further features thereof, is reached in a plant that is made and operates as recited in the appended claims.

BRIEF DESCRIPTION OF THE DRAWINGS

The present invention may take the form of a preferred, although not sole, embodiment, such as the one that is described in detail and illustrated below by way of non-limiting example with reference to the accompanying drawings, in which:

FIG. 5 is a plan view of a portion of a plant according to the present invention in a definite operating state thereof;

FIG. 6 is a cross-sectional view of the plant portion illustrated in FIG. 5, along section B—B thereof;

FIGS. 7 and 8 are the same views as the ones appearing in FIGS. 5 and 6, respectively, in a different operating state of the plant;

DETAILED DESCRIPTION OF THE PREFERRED EMBODIMENT

Figure 1:
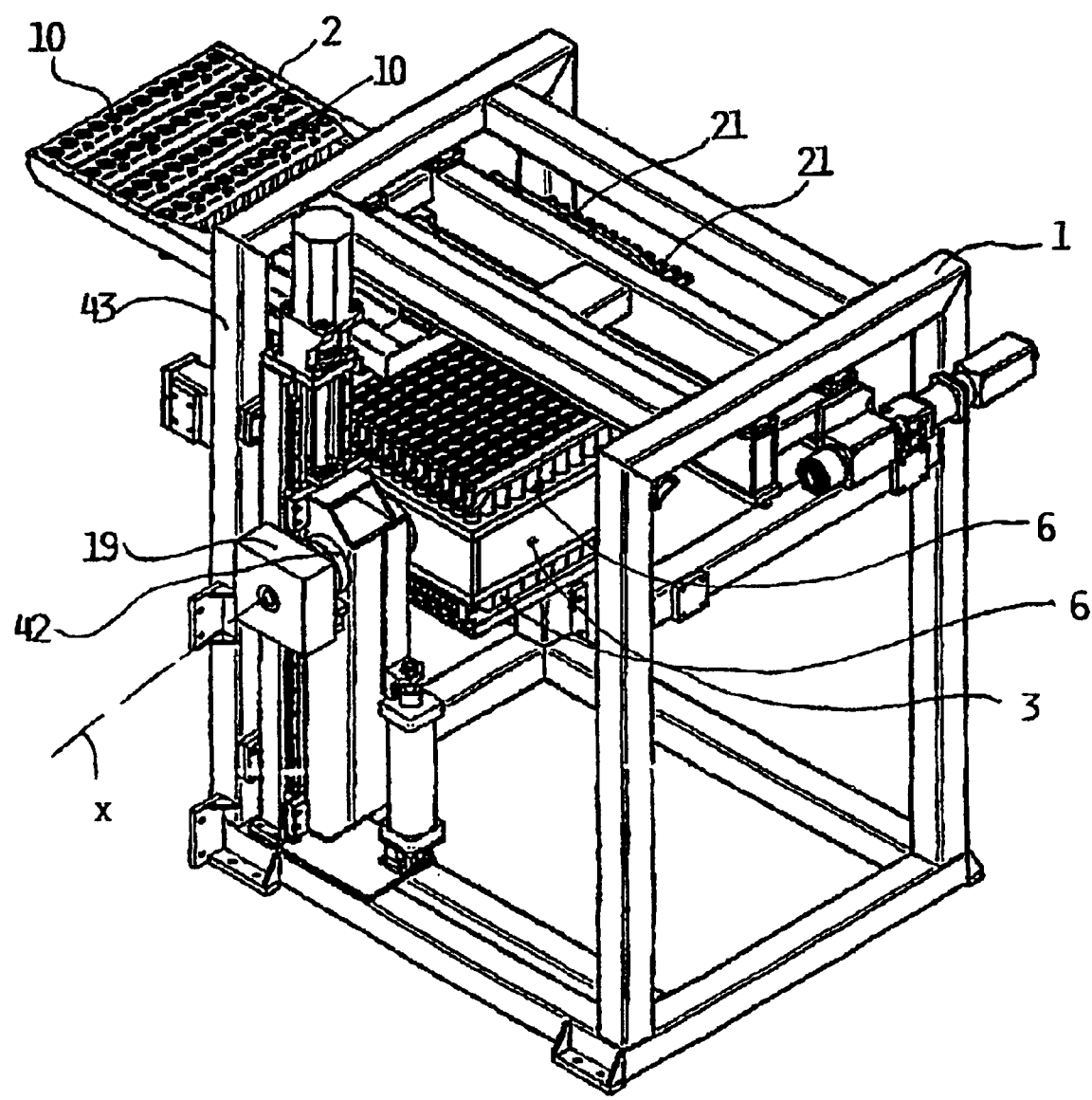
FIG. 1 is a diagonal perspective view of a plant according to the present invention.

With reference to the above listed Figures, a revolving turret plant according to the present invention comprises:

a load-bearing structure 1, a collection and translation element 2;

a plurality of receptacles 10 provided in the collection and translation element 2;

a revolving turret 3, with two distinct opposite outer surfaces 4 and 5 on which there are arranged two respective pluralities of cups 6 adapted to accommodate respective preforms;

retaining and release means adapted to selectively retain and release the preforms inserted in the cups;

means adapted to selectively engage the preforms inserted in their respective receptacles 10 and disengage them from the collection and translation element; and device 19 adapted to selectively rotate the revolving turret 3 about a horizontal axis X so that the two opposite surfaces 4 and 5 can alternately exchange their position, in particular upwards and downwards.

As this is illustrated in particular in FIG. 1, the collection and translation element 2 is provided with means that make it adapted to perform a horizontal movement, inserting it alternately into a preform injection-moulding machine (not shown) and into the load-bearing structure 1 and, in particular, the above said revolving turret 3.

Figure 20:
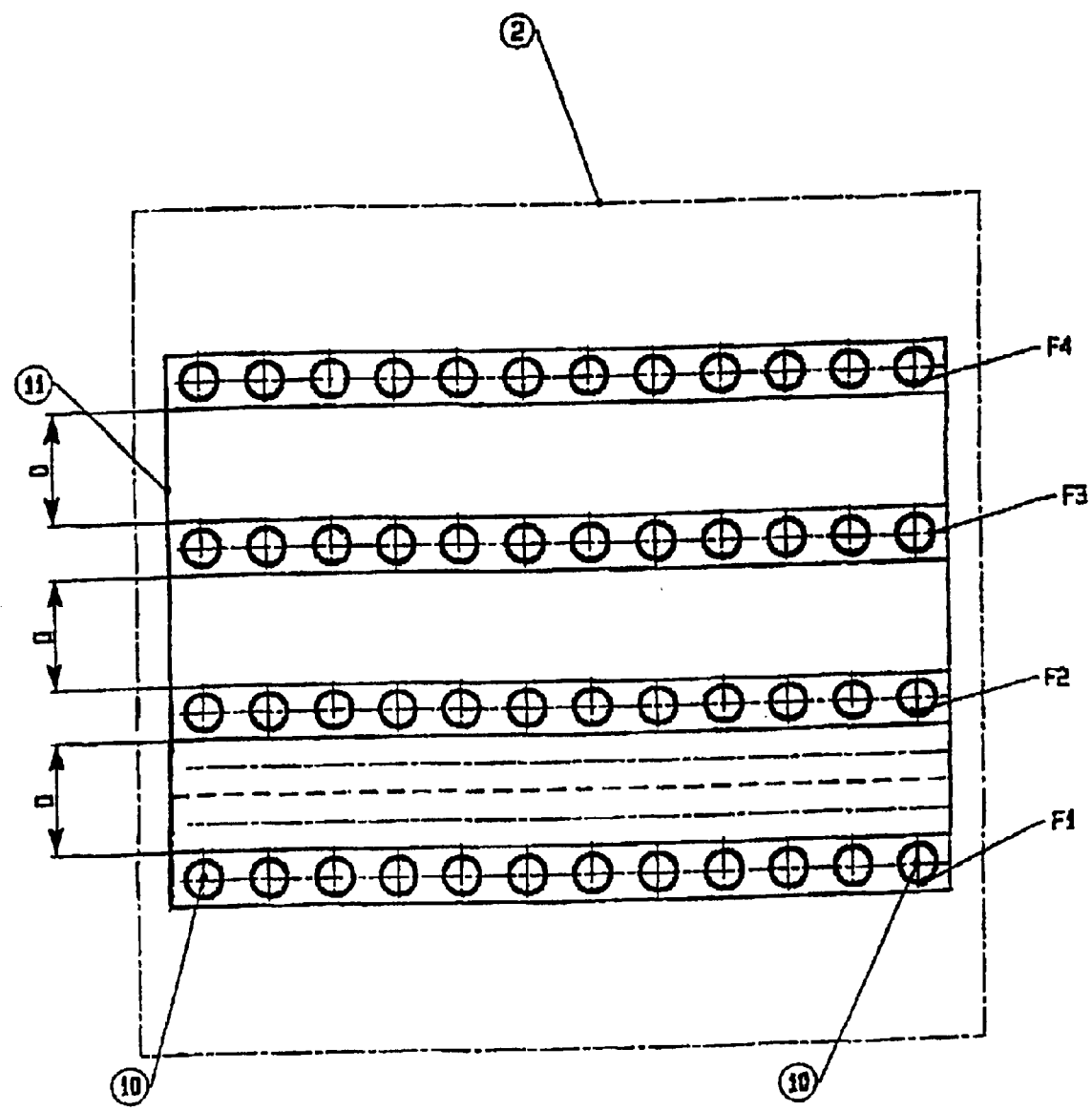
FIG. 20 is a symbolical view of the geometric arrangement of preforms in a portion of the plant.

The receptacles 10 provided in the element 2 are distributed according to the following geometric pattern. With reference to FIG. 20, the receptacles 10 are arranged along four rows, indicated at F1, F2, F3 and F4, respectively, in which they are aligned and equally spaced from each other; furthermore, each row constitutes a single group of receptacles.

Each row extends parallel to and equidistant by a distance D from the contiguous rows, in such a manner that the totality of the rows identifies a rectangular perimeter 11, as illustrated in the Figure.

In order to be able to better develop the continuation of this description, the overall geometry defined by the totality of the receptacles 10 included in all the rows of the element 2 will be defined as "distribution pattern".

In an advantageous manner, and to the purpose of making the most out of the available space, each row, which is identical to, i.e. is the same as, the remaining ones, includes the highest possible number of receptacles 10 as allowed by the length of the same row, owing to reasons that will explained in a greater detail further on.

Furthermore, the afore cited distance D separating contiguous rows of receptacles from each other must be equal to a multiple of the distance separating from each other the contiguous, parallel rows provided on the two opposite surfaces of the revolving turret; this is intended to make it possible for the element 2 to be able to be arranged into a plurality of distinct and selectively definable positions above the revolving turret.

Each row of receptacles of the element 2 is therefore capable of arranging itself above a respective row of cups 6 in the revolving turret.

This quite obviously allows the element 2 to load all of the cups provided on said revolving turret by successive cycles, while each time unloading a successive load of preforms on to a different geometry or pattern of cups by simply displacing and arranging in the proper position the element 2, so that the distribution pattern of the receptacles arranges itself exactly above successive geometries or patterns on the revolving turret.

Since the task of the receptacles is to:

intercept the preforms released by appropriate means provided above the collection and translation element 2, collect said preforms in an orderly manner and orientate them vertically, i.e. with their neck portion or opening turned upwards, transfer them above the revolving turret, and finally let them fall into the respective cup, the receptacles and, more generally, the element 2 are provided with appropriate means that are adapted to selectively retain said preforms from falling down and releasing them downwards.

In a preferred manner, the means are constituted by one or more guillotine-like devices constituted by two plates 13 and 14, i.e. a first plate 13, called neck centring, which has twelve perforations 15 having a diameter that is slightly larger than the diameter of the neck of the preform, and is stationary, and a second moving plate 14, constituting the actual guillotine, which has twelve buttonhole-shaped apertures having a smaller width than the diameter of the preform neck and terminating with a hole that on the contrary has a larger diameter than the preform neck.

Figure 2:
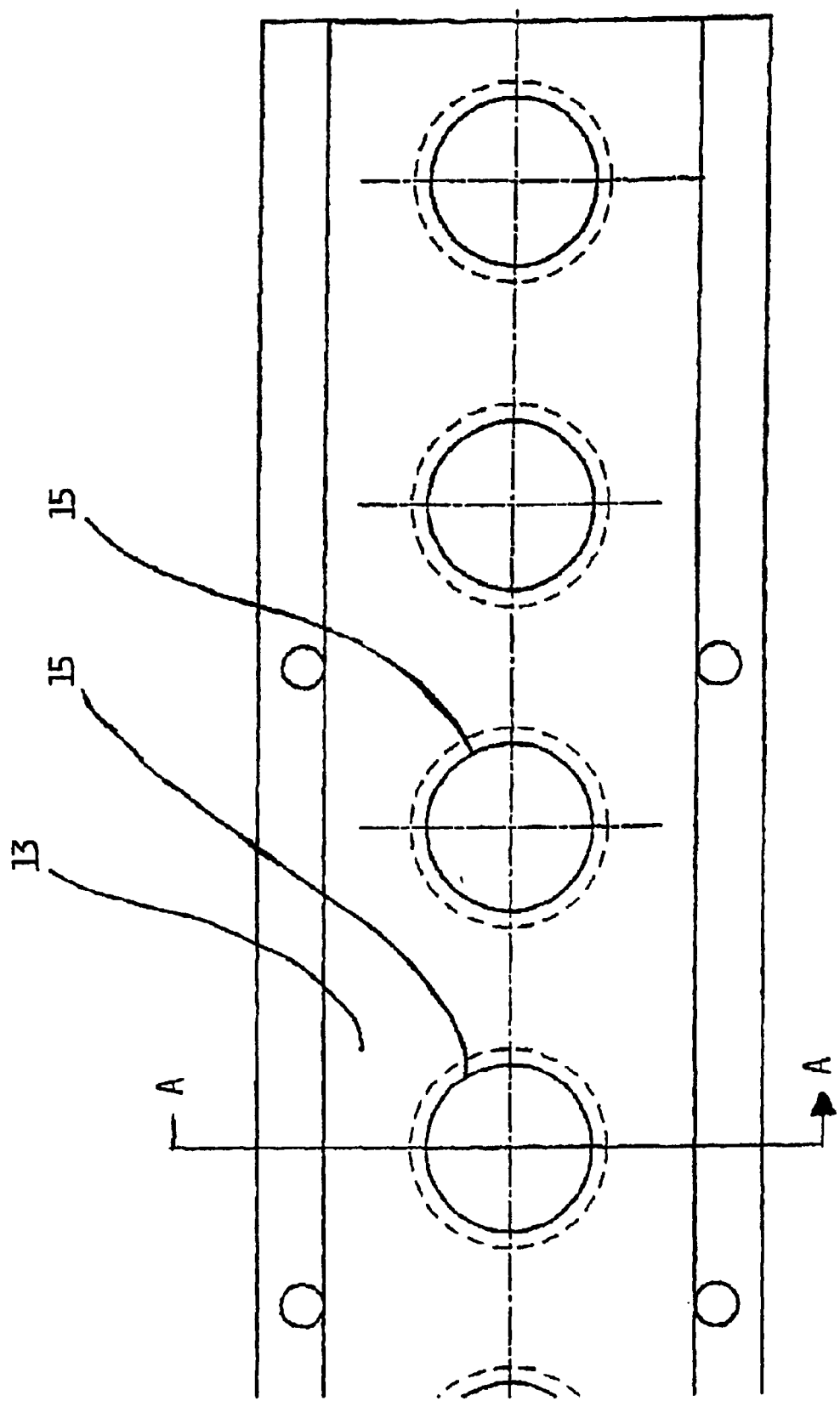
FIG. 2 is a top view of a first component part of a plant according to the present invention.
Figure 3:
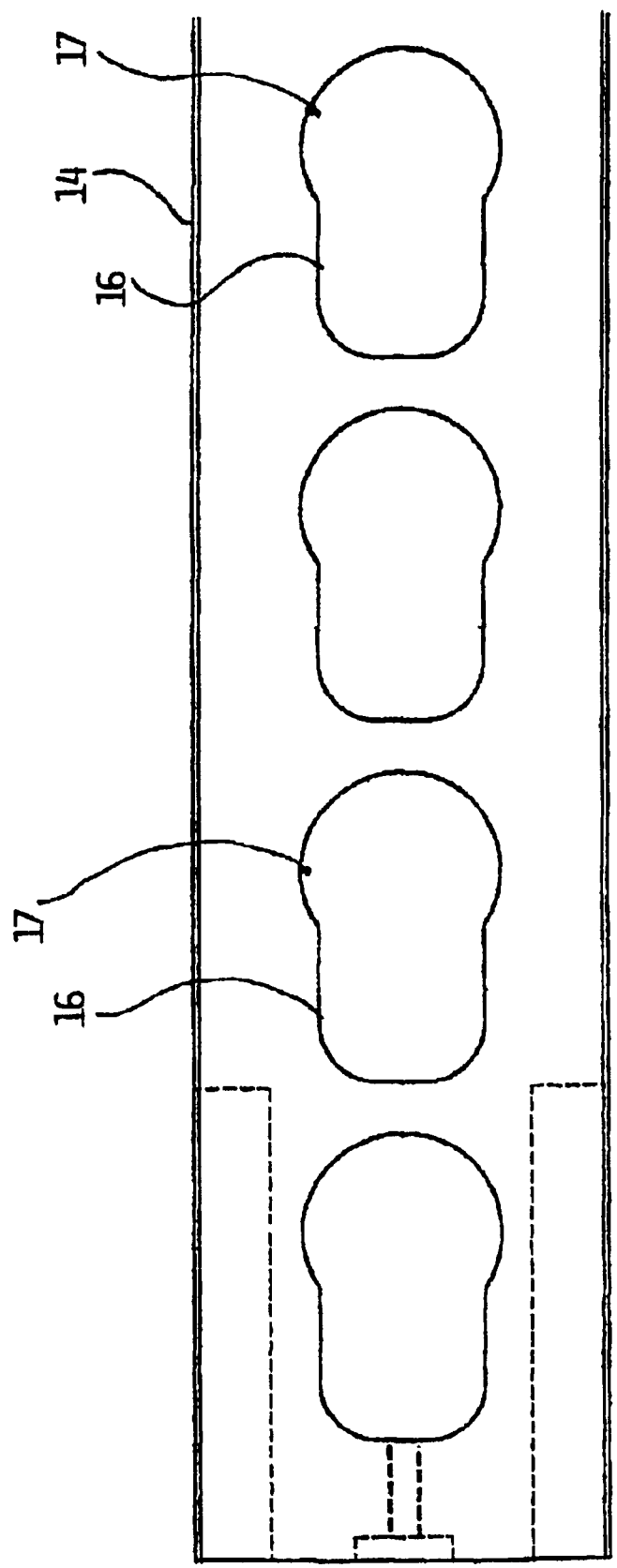
FIG. 3 is a top view of a second component part of a plant according to the present invention.
Figure 4:
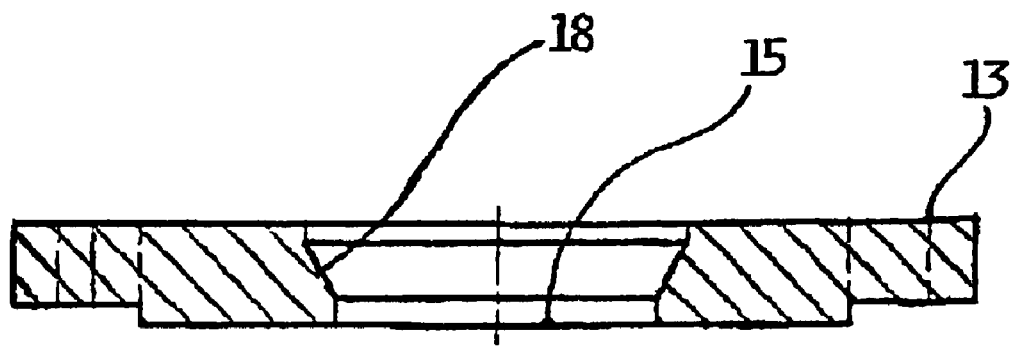
FIG. 4 is a cross-sectional view of the component part of FIG. 2 as seen along section A—A.

The plate 13 is arranged on top and the plate 14 is arranged below; the plate 13 is stationary, whereas the plate 14 is adapted to selectively slide against said upper plate 13. With reference to FIGS. 2, 3 and 4, the lower plate 14 is provided with a plurality of buttonhole-shaped apertures, each one of which is formed so as to include a first portion 16, whose cross-section is such as to enable the body of the preform, but not the neck portion thereof, to pass therethrough, and a second portion 17 whose cross-section is such as to enable the whole preform to pass therethrough.

In a preferred manner, in order to facilitate the falling preform to be intercepted and centered, the upper portion 18 of said perforations 15 in the upper plate 13 has an upward flared shape following a frustoconical pattern, as this is best illustrated in FIG. 4.

For reasons that will be better explained and understood later on in this description, it is of fundamental importance for pairs of upper and lower plates 13 and 14 to be provided and arranged in such a manner as to ensure that each such pair of plates corresponds to a same row of receptacles 10; as a result, there will be provided as many pairs of plates there are rows.

As far as the revolving turret 3 is concerned, its task lies in reducing the temperature of the preforms that come out of the injection-moulding press.

This turret is formed by a parallelepiped-shaped body on which there are arranged the two opposite surfaces 4 and 5, each one of which is provided with an equal number of cooling-down cups 6.

Each preform is contained individually in elements that are usually called "cups", which must be changed whenever the type of preforms being produced is changed, since they perfectly replicate the contour of the preform.

The cooling-down effect is obtained through the circulation of water at a low temperature around each such cup. Anyway, the means and the techniques used to implement such circulation are well-known to those skilled in the art.

Figure 21:
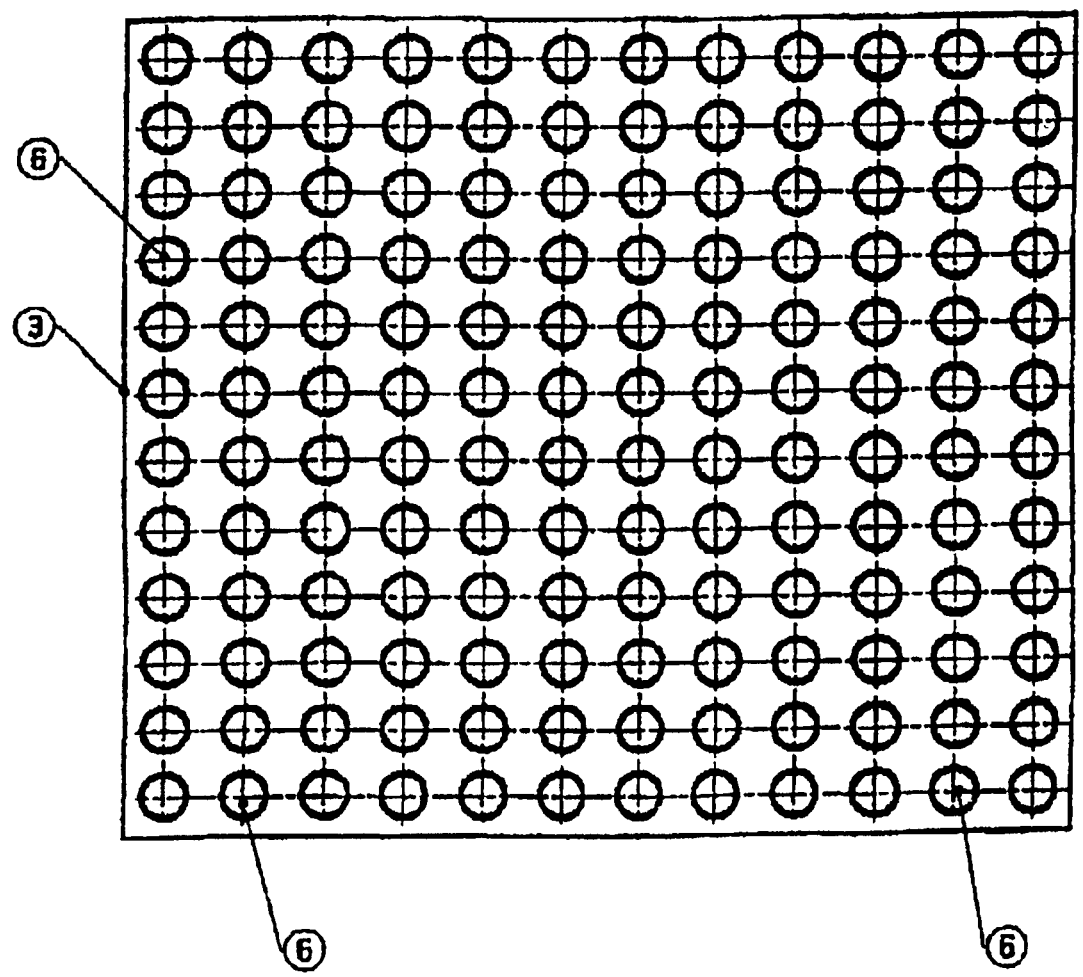
FIG. 21 is a symbolical view of the geometric arrangement of the preforms in another portion of the plant.
Figure 22:
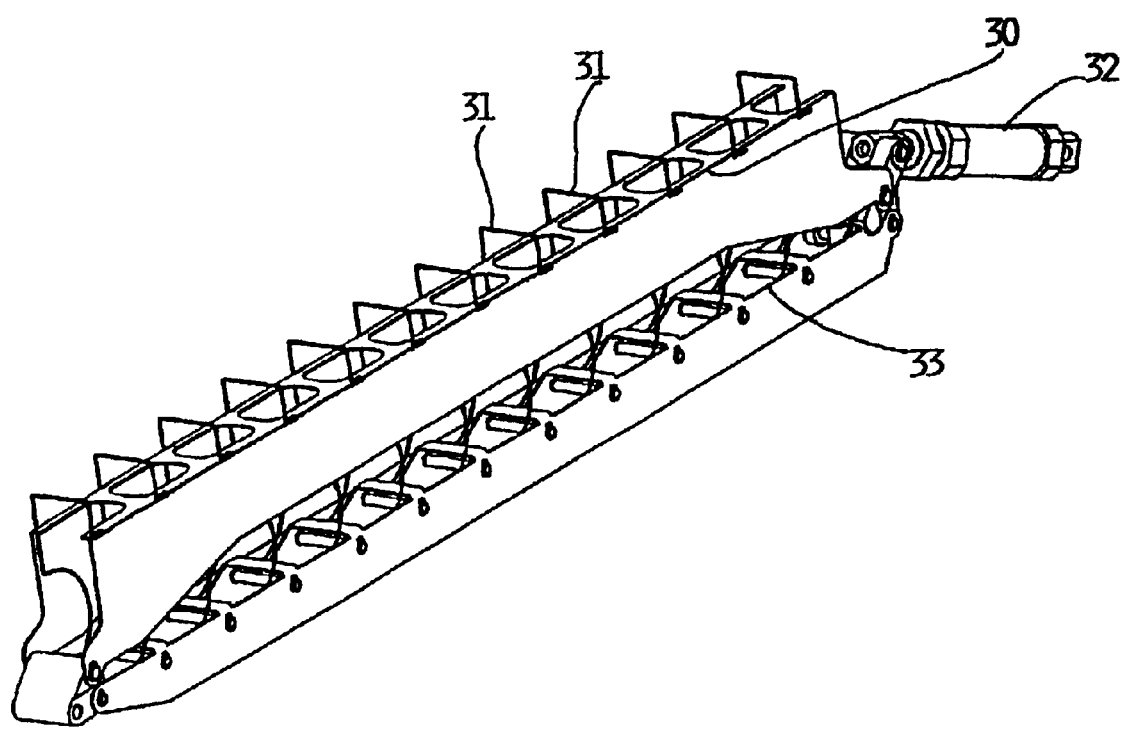
FIG. 22 is a perspective view of a device of the plant according to the present invention.

Each one of the surfaces 4, 5 is provided with a plurality of cups arranged in such a manner and in such a number as to make it possible for them to be gathered into a variety of distinct, but geometrically similar "distribution patterns", as better defined earlier in this description, which can be accommodated at the same time on the same surface. Each one of the surfaces 4 and 5 is illustrated in FIG. 21, where the arrangement of the respective cups is shown.

As this clearly emerges from the same Figures, all of the rows forming the geometrical patterns are parallel with respect to each other and, furthermore, the whole area of the outer surfaces 4 and 5 is occupied by respective cups, each one of which belongs to a same and single pattern.

Furthermore, the described means, as well as other associated guiding, actuation, support means, or means that are anyway associated to the correct operation of the plant, and that are within the capabilities of those skilled in the art, are implemented in such a manner as to ensure that the collection element 2 is capable of moving from a position outside the structure to a plurality of selectively controlled positions located above one of the outer surfaces 4 and 5 of said revolving turret in such a manner as to enable the distribution pattern of the collection and translation element 2 to move into selectively and exactly lying above the three distinct, different distribution patterns of the cups arranged on the outer surfaces. In this manner, the preforms that are released by the element 2 are able to fall by gravity exactly into their respective cups of a same distribution pattern thereof provided on the outer surfaces 4 and 5.

The revolving turret is further provided with rotation members 19 and associated devices so as to be able to be rotated by 180° about a horizontal axis thereof that passes through the center of the parallelepiped forming the turret itself, so that the surfaces of the turret are able to exactly exchange their respective positions, upwards and/or downwards.

On the basis of the considerations that have already been made on the longer duration of the cooling-down time with respect to the duration of the actual injection-moulding process, those skilled in the art will now be fully capable of understanding the basic operating features of the plant.

Figure 9:
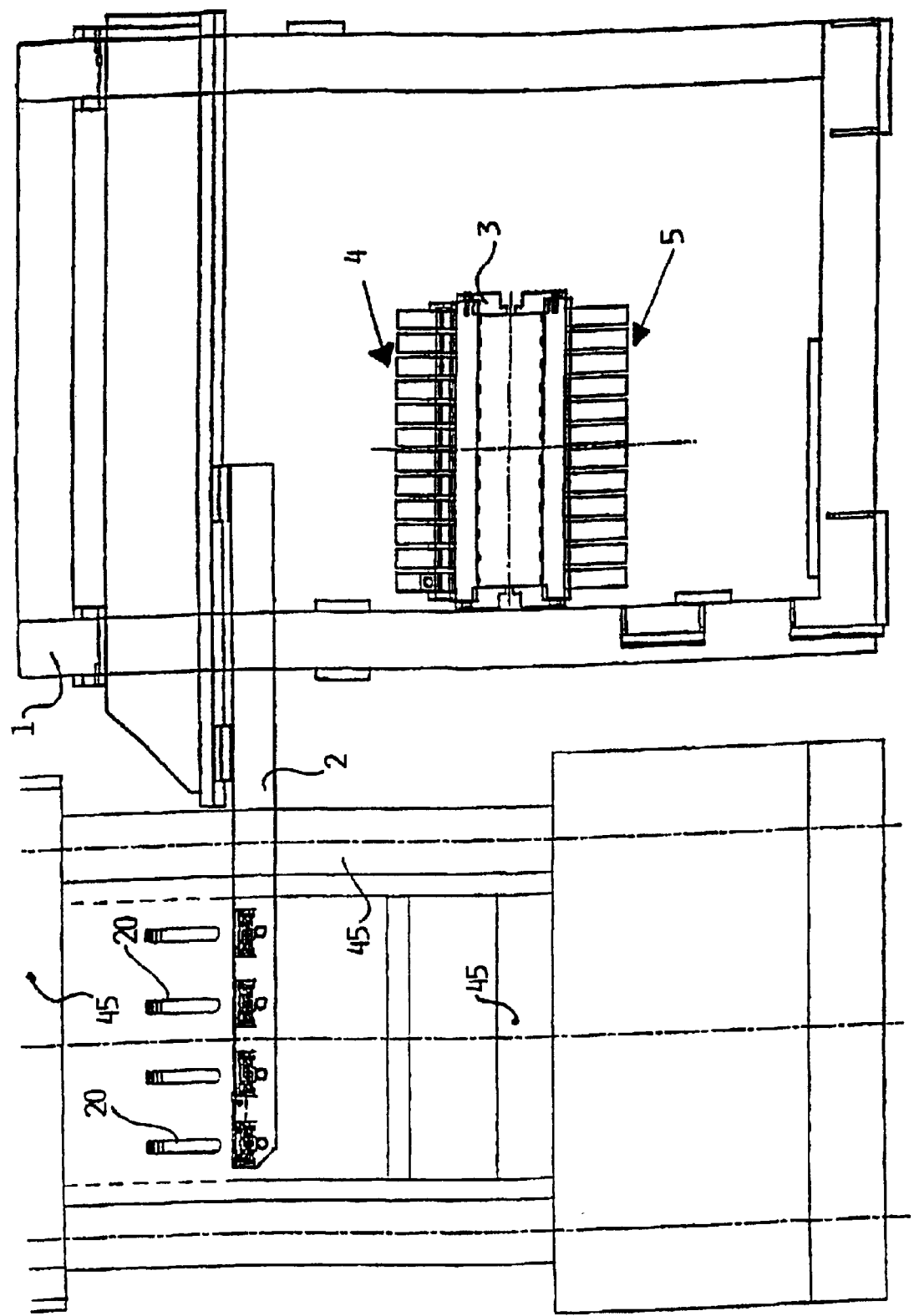
FIGS. 9 through to 19 are schematical views of respective successive phases in the operational state of a plant according to the present invention.

With reference to FIGS. 9 through to 19, it can be noticed that, in the two first phases represented in FIGS. 9 and 10, the preforms 20, which have just been moulded in and released by an appropriate injection-moulding press 45, fall on to the element 2 which is appropriately displaced into its position outside the load-bearing structure 1. Here the preforms are retained since it is actually the sole body of the preform, and not the neck portion thereof, that is able to pass through the guillotine. In fact, the preform gets inserted in the upper plate 13 and, with its body, also in the portion 16 which has such a diameter as to prevent the neck portion thereof to pass therethrough.

In this phase, the plates 13 and 14 are of course arranged in such a manner as to ensure that the aperture 15 of the plate 13 moves into a coaxial arrangement with respect to a corresponding portion 16 of the plate 14. The preform is facilitated in its getting inserted and centered in the respective aperture 15 in that the latter is provided with an upward flared portion 18.

Figure 11:
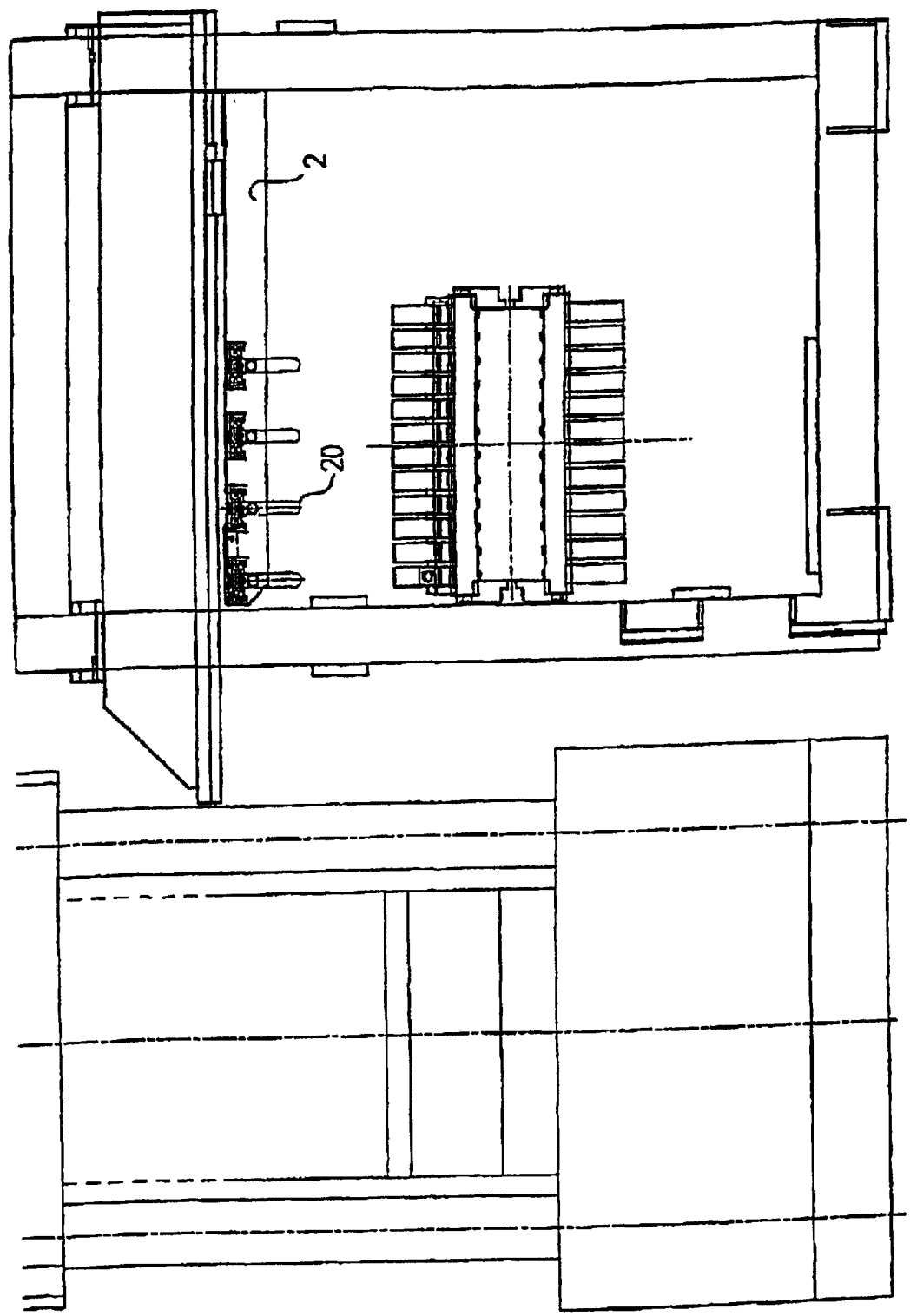

In the following phase, which is illustrated in FIG. 11, the element 2 is displaced above the revolving turret, and namely in the position in which the distribution pattern of the element 2 lies vertically above one of the three distribution patterns provided on the outer surface 4 that is in this moment oriented upwards. During the translation of the element 2, the preforms are retained laterally by both the guillotine and the neck centering.

Figure 12:
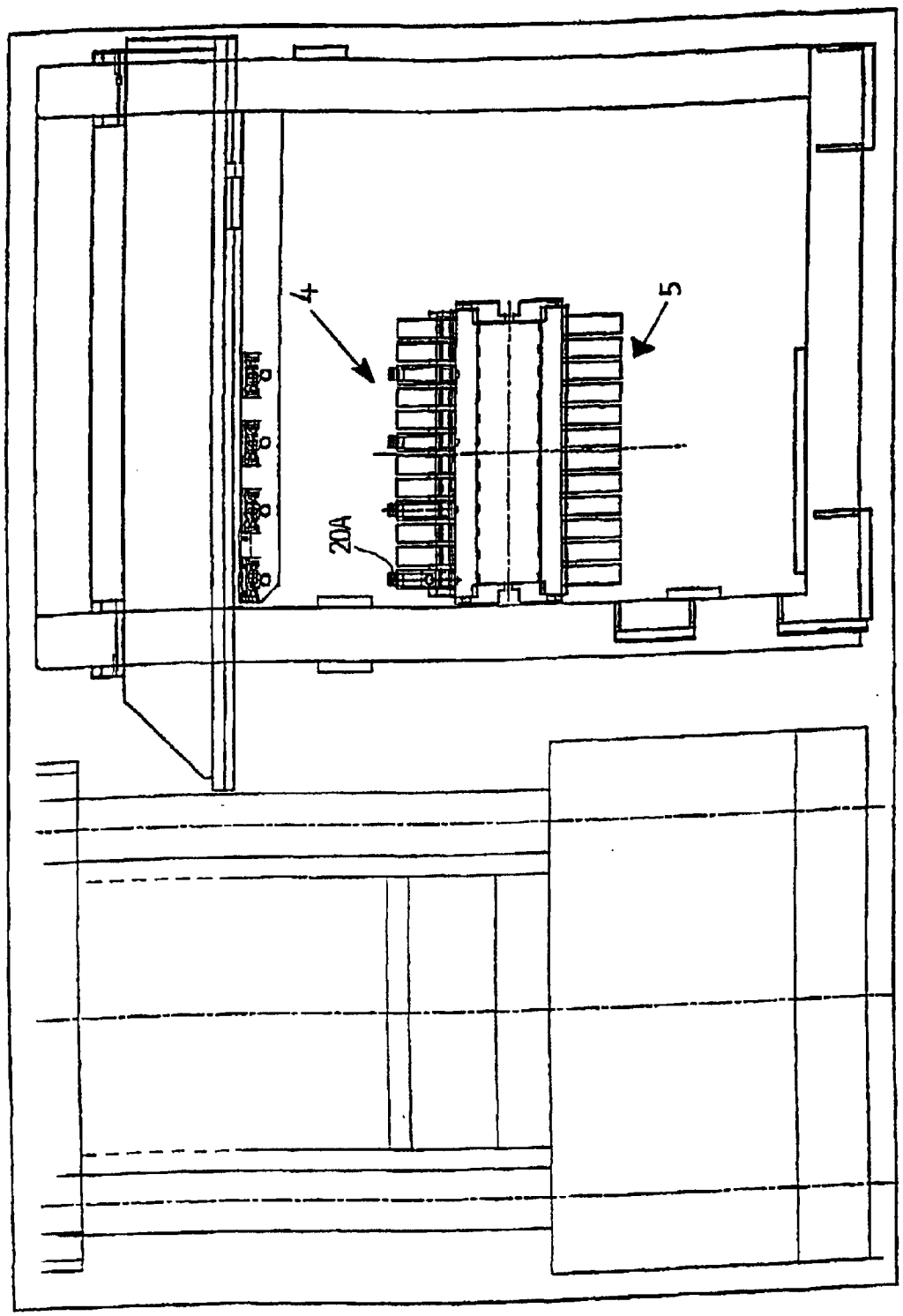

In the subsequent phase illustrated in FIG. 12, the preforms are released from the element 2 and fall by gravity into the respective cups 6.

Such a release of the preforms occurs by causing, by means of a plurality of appropriate actuators 21 illustrated in FIG. 1, the lower plates 14 to slide with respect to the upper plates 13 in such a manner as to enable the apertures 15 to move into mating correspondence with respective enlarged portions 17 of the corresponding lower plate.

The preforms, that are no longer retained by the neck portion thereof by the lower plate 14, are in this way able to fall and get exactly inserted in the respective cups 6 on the surface 4 or 5 of the revolving turret, wherein the cups are arranged exactly according to the distribution pattern on the element 2.

The configuration of the plates and the still unreleased preforms is more clearly illustrated in FIGS. 5 and 6, while the respective configuration with preforms being released is illustrated in FIGS. 7 and 8.

Figure 13:
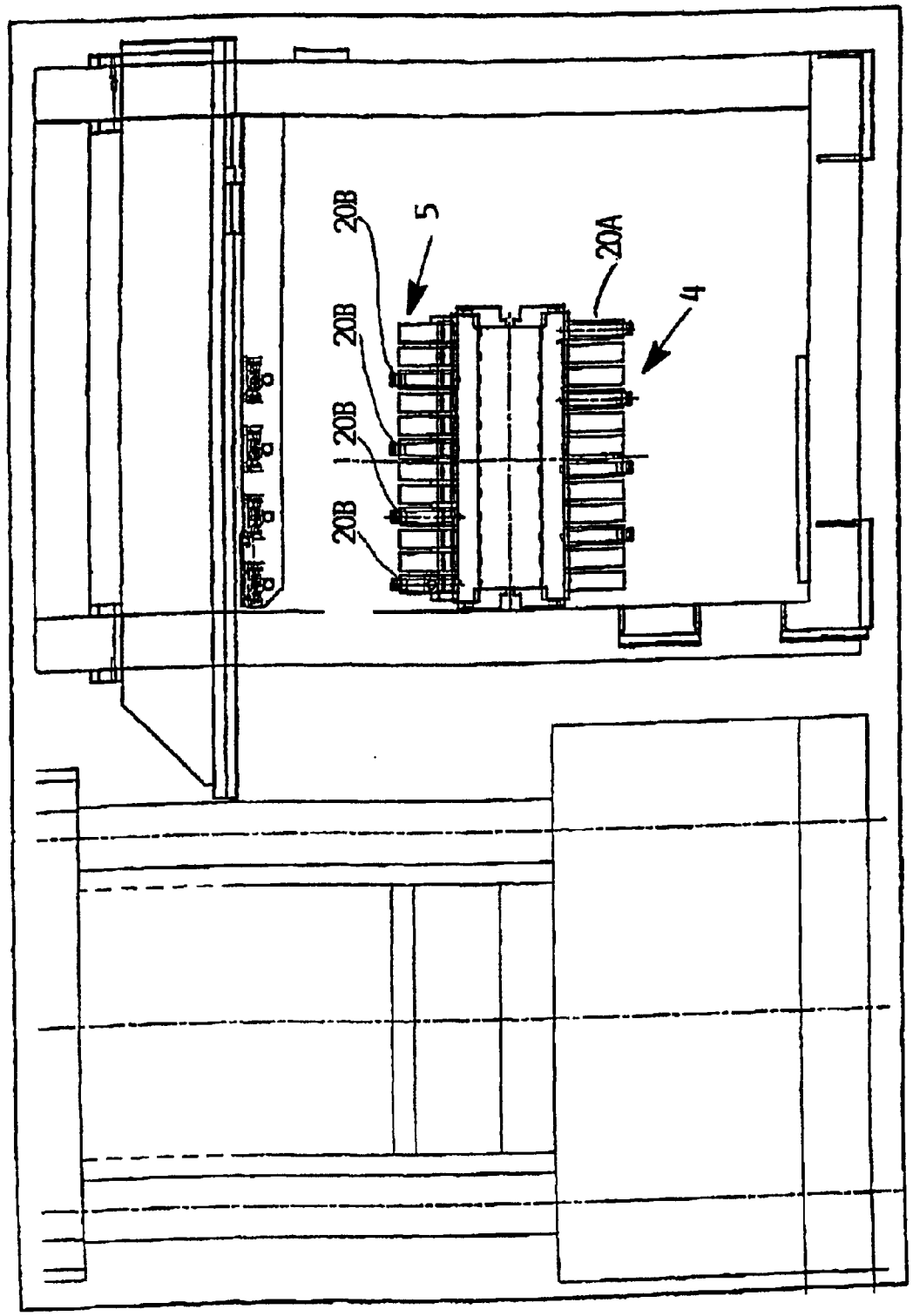

The revolving turret is subsequently rotated by an angle of 180° about the axis X, in such a manner as to enable the preform 20A in FIG. 12 to move into the position indicated in FIG. 13. Furthermore, during such a rotation, a second collection and insertion cycle is performed, similarly to the cycle illustrated in FIGS. 9 to 11, to so collect and insert a subsequent group of preforms, so that at the end of the second cycle there occurs a new insertion of preforms indicated at 20B. This situation is completely illustrated in FIG. 13, with the surface 4 now being turned downwards and the surface 5 upwards.

Figure 14:
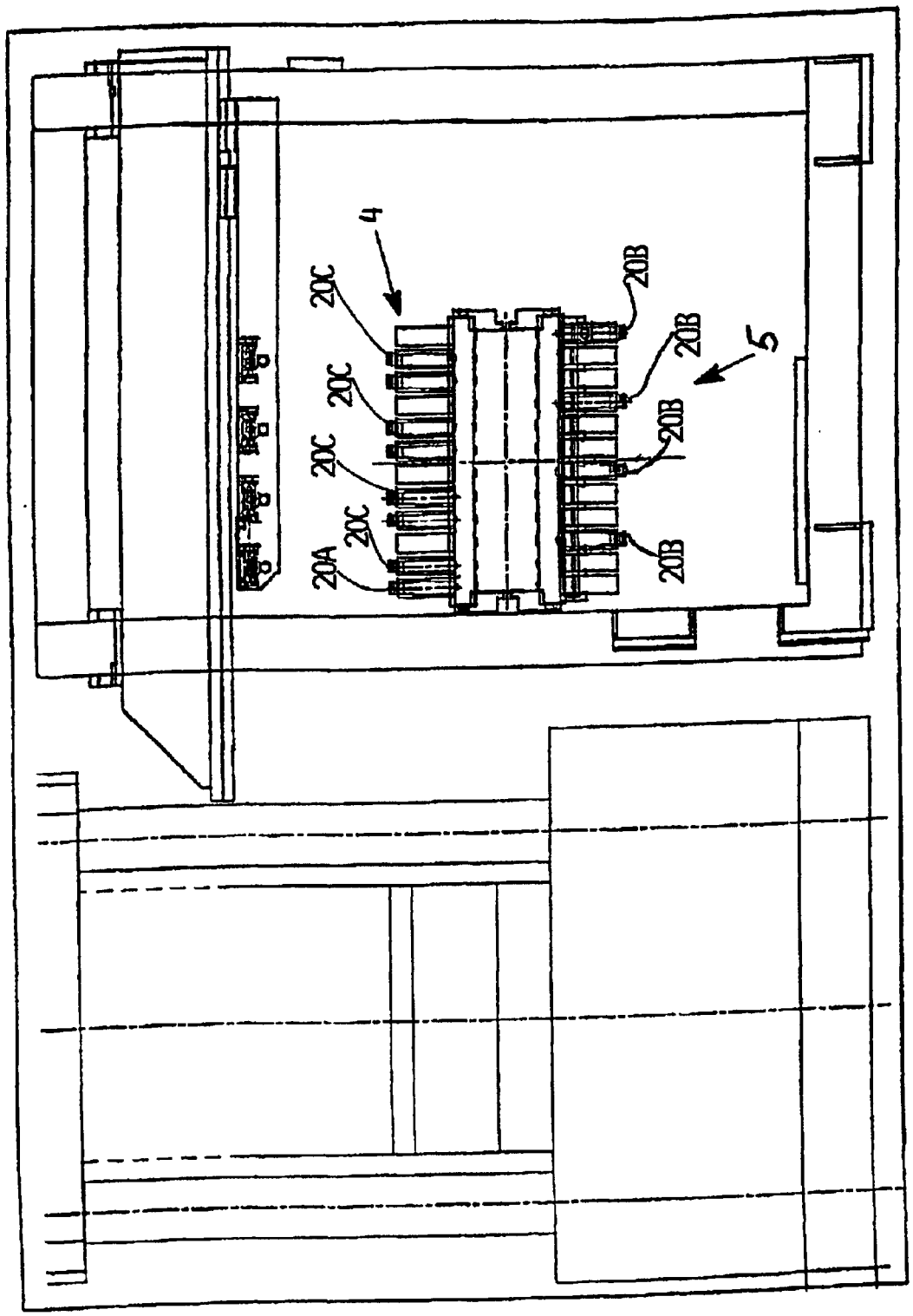
Figure 15:
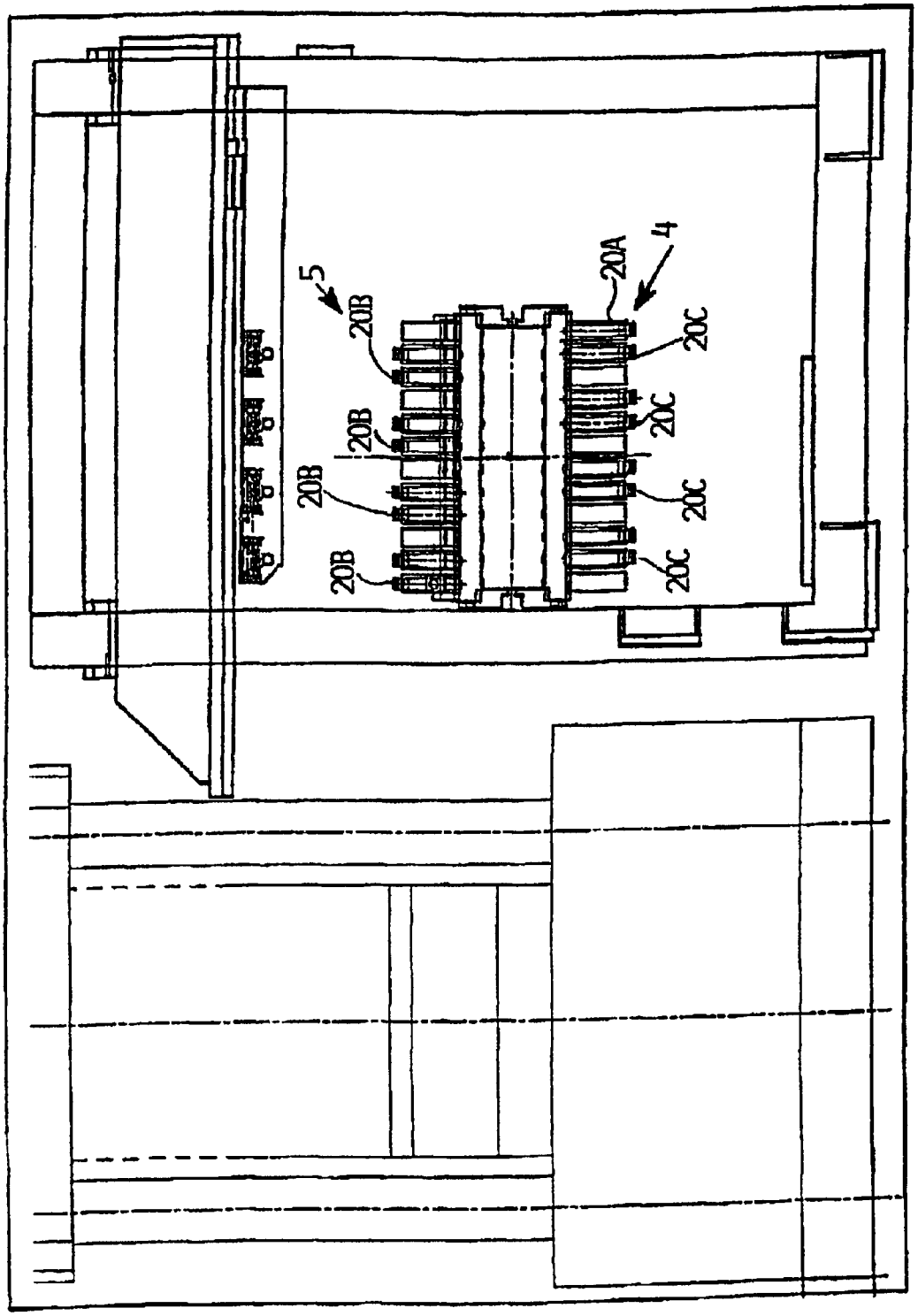
Figure 16:
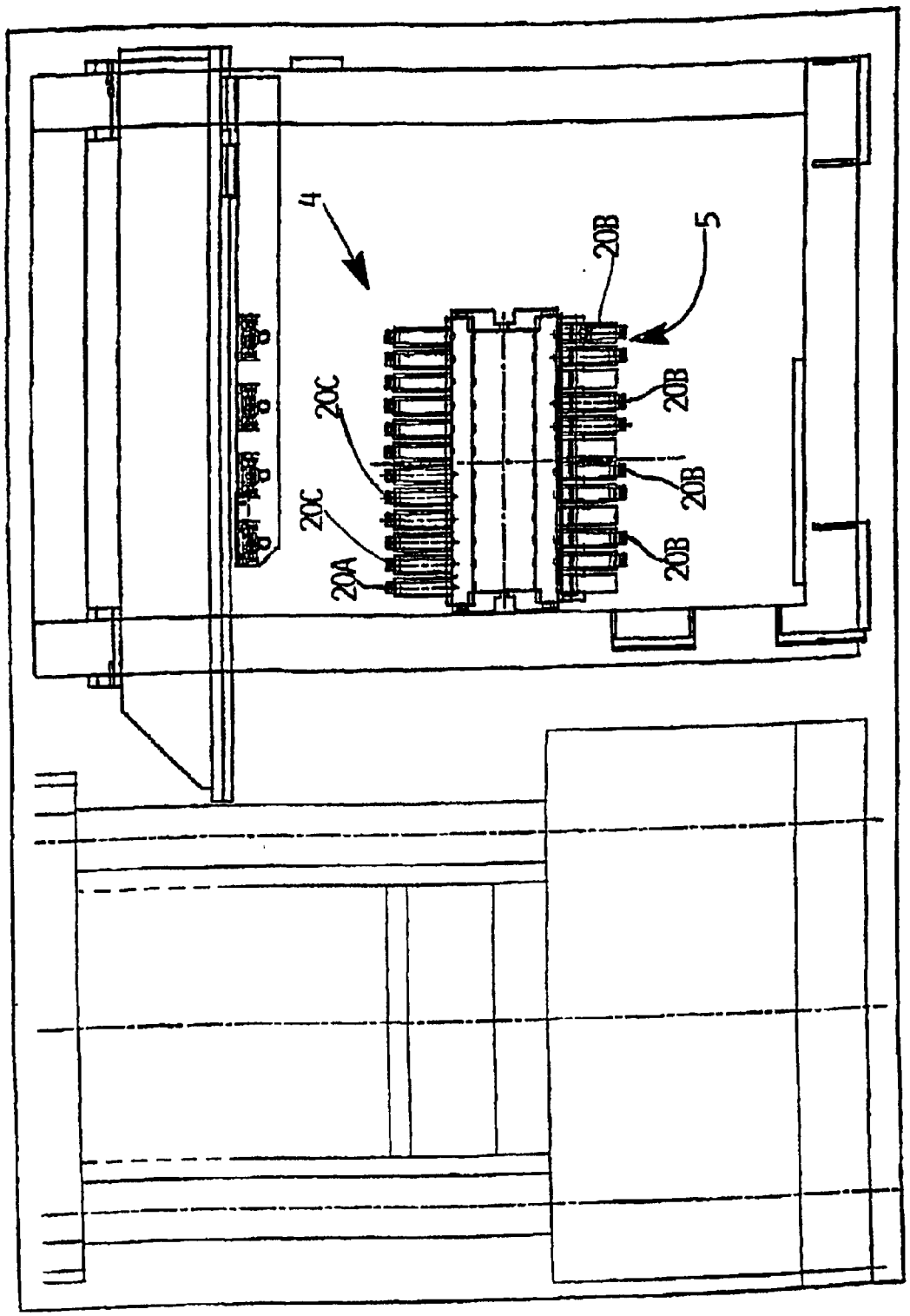

A third cycle of collection of preforms and rotation of the revolving turret 3 is then carried out in exactly the same manner as the preceding cycle, including the rotation of the turret 3, which therefore resumes its position with the surface 4 turned upwards, but with the difference that the element 2 is displaced into a new position above the turret, so as to come to lie exactly above the second distribution pattern of cups provided on the same surface 4. This new situation is therefore illustrated in FIG. 14, in which the just released preforms are indicated at 20C.

Figure 17:
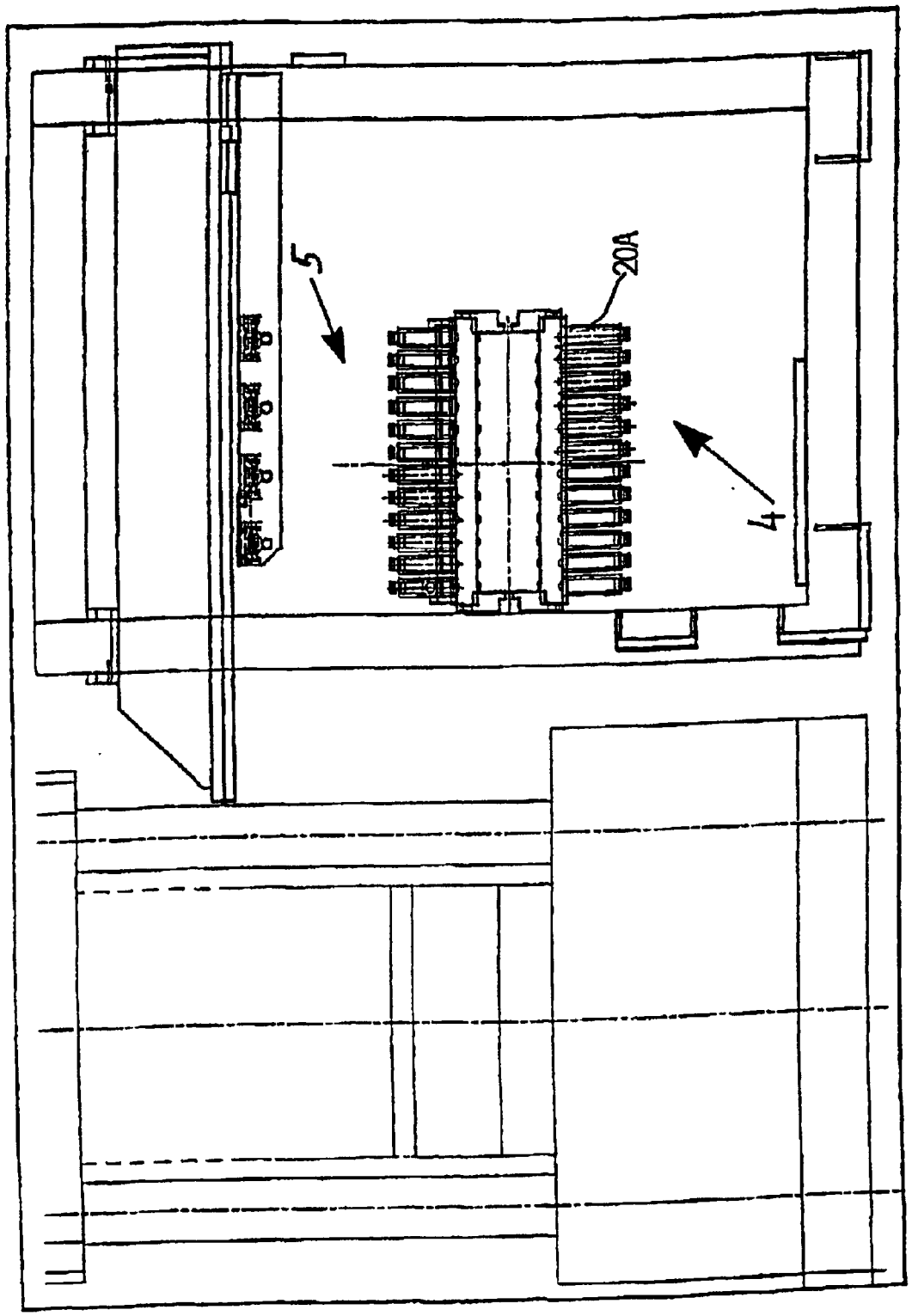

The above described process is repeated in exactly the similar way for such a number of times as to ensure that all of the six distribution patterns of cups on the two surfaces 4 and 5 of the revolving turret are successively filled by the element 2 with respective preforms, as shown in FIG. 17, and therefore for a total of six successive fillings thereof.

Figure 18:
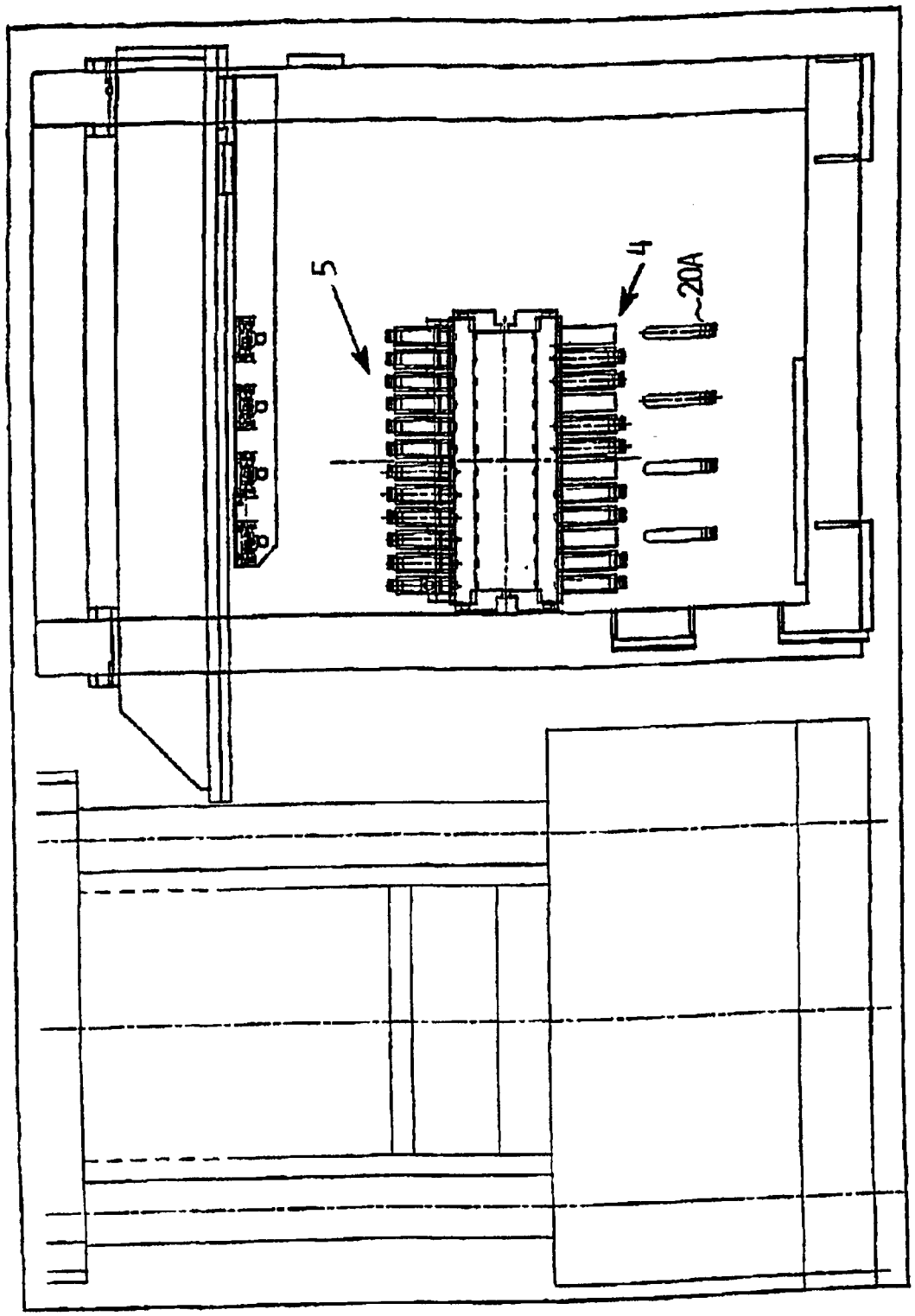
Figure 19:
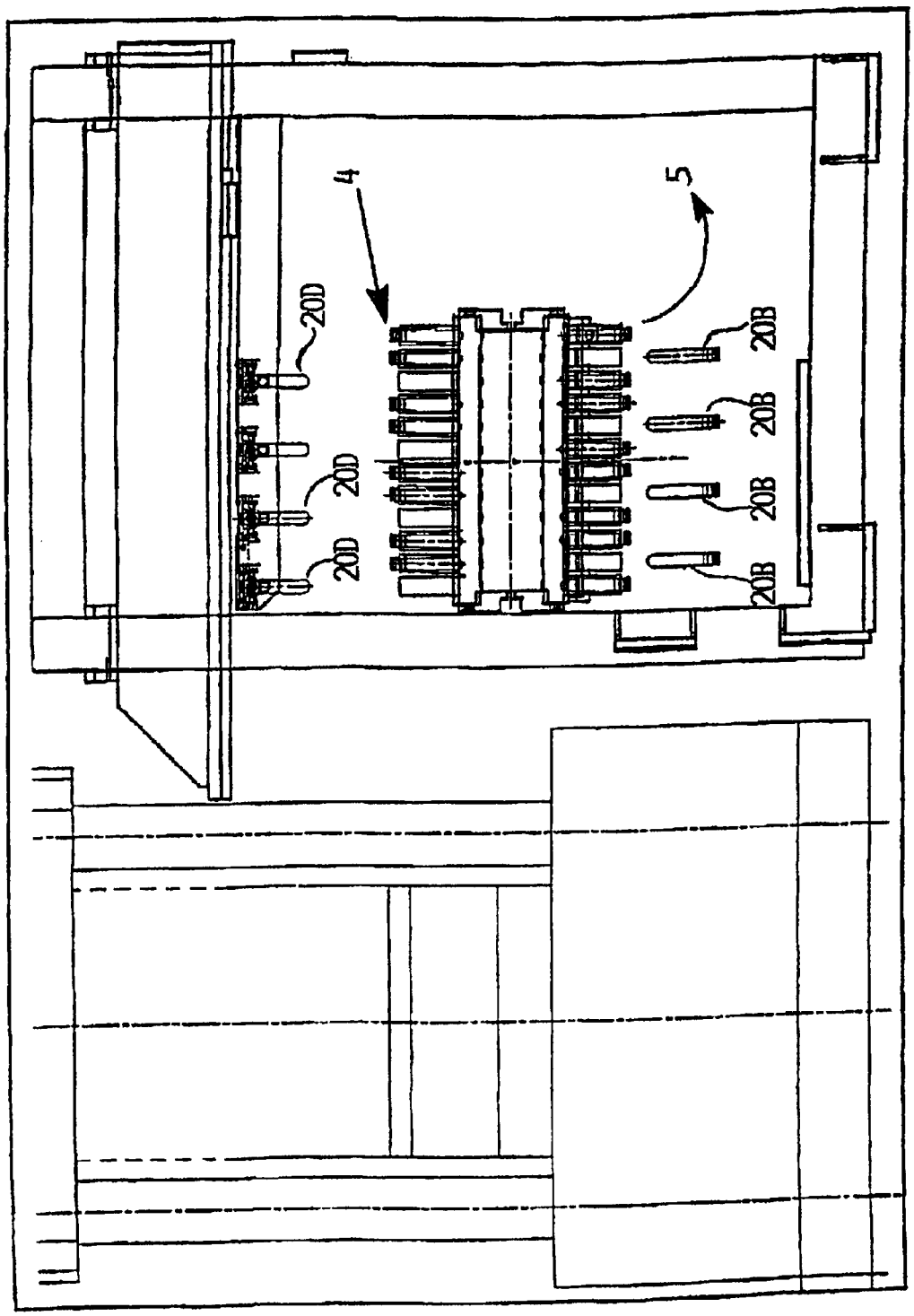

Then, as illustrated in FIG. 18, the preforms 20A, which were the first ones to be loaded in the revolving turret, are released from the latter and fall by gravity on to collection means arranged below the turret (and not shown). Subsequently, as illustrated in FIG. 19, the turret rotates by a further angle of 180° so that also the preforms indicated at 20B are released therefrom, while the cups that have been cleared by the preforms 20A are now situated upwards and are so made ready to accommodate a subsequent group of preforms 20D.

At this point, the process goes on regularly on a continuous running basis, in the sense that each elementary cycle is performed to include:

a rotation by an angle of 180° of the turret, a release from the turret of a group of preforms, all of them belonging to the same distribution pattern, which had previously been loaded in the same turret in advance of the other ones, and a loading in the turret, by the element 2, of a new group of preforms according to the same distribution pattern.

Those skilled in the art will therefore be able to readily appreciate that the described solution effectively enables a plurality of preforms, as appropriately gathered into a number of distinct distribution patterns, to be accommodated in a very limited space duly fitted for cooling down the same preforms. In fact, if the number of distribution patterns available on each surface of the turret is indicated as n, the total number of the various distribution patterns available on the two surfaces 4 and 5 will be 2 n, and, if the total duration of the cooling-down phase of the preforms in the turret is for technical reasons pre-set at T, it will be obvious that it is possible for a release of preforms to be obtained every period T/2 n.

It is therefore to such a same period T/2 n that the time, i.e. duration, of the elementary cycle including preform injection, solidification and removal from the mould can be actually brought down to. Conversely, it is possible for the cooling down time to be proportionately increased, and such an increased time of cooling down of the preforms outside the mould enables the overall productivity of the plant to be effectively boosted owing to the preforms being actually knocked out of the mould in advance of the usual time, considering that a part of the terminal injection-moulding process, which includes exactly the preform cooling-down phase, is moved outside of the mould.

However, the insertion of the preforms in the appropriate cups gives rise to the problem connected with the need for the same preforms to be firmly retained there when the revolving turret is rotated and the preforms themselves are therefore orientated downwards. In order to prevent these preforms to fall out in advance of the due moment, there is therefore provided an appropriate device comprising a first plane 30 adapted to move and arrange itself between the neck portion of the preform and the respective cup, a second plane 33 carrying spring nails 31, and a pneumatic cylinder 32 actuating both the planes 30 and 33.

Figure 23:
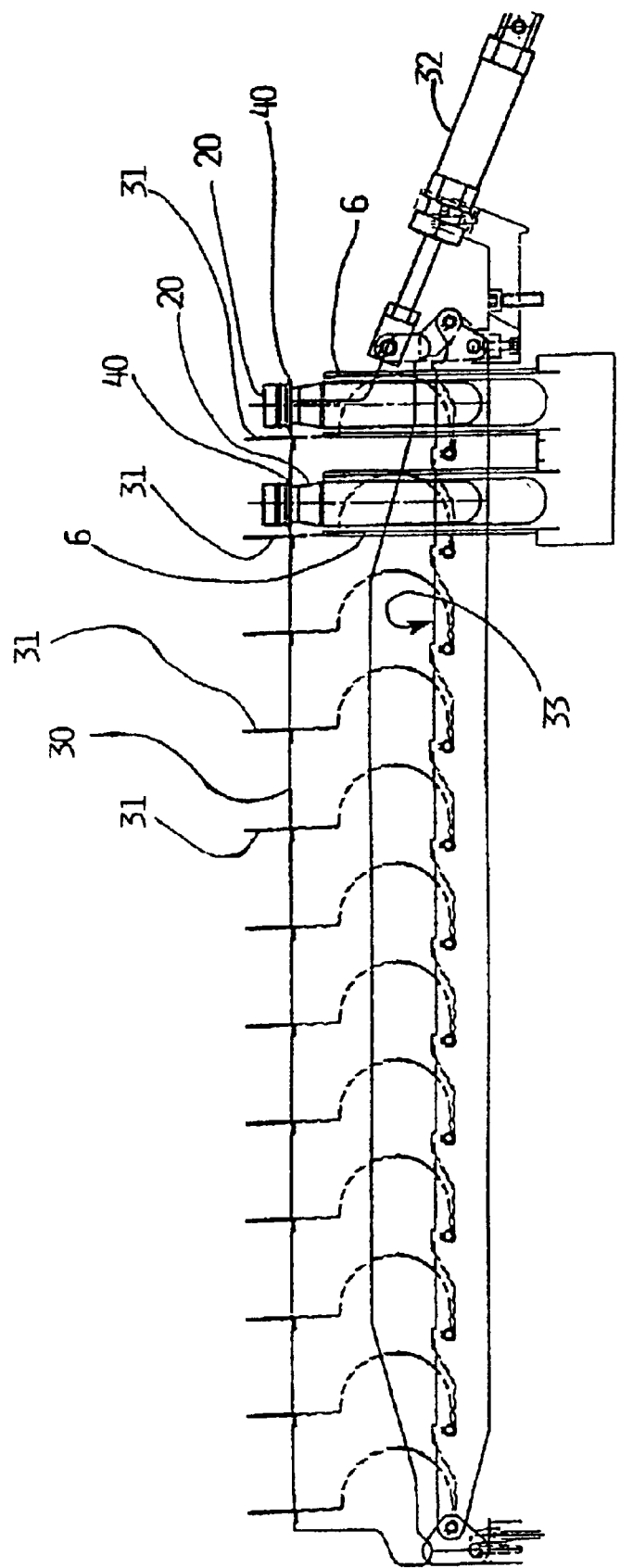
FIG. 23 is a symbolical orthogonal side view of the device illustrated in FIG. 22 in a first operating state thereof.

During preform insertion, this device is in the state as illustrated in FIG. 23, ie. with the preform 20 that is just partially inserted in the respective cup 6, owing to any further insertion thereof being prevented by the contrast of the first plane 30 with the neck portion 40 of the preform.

Figure 24:
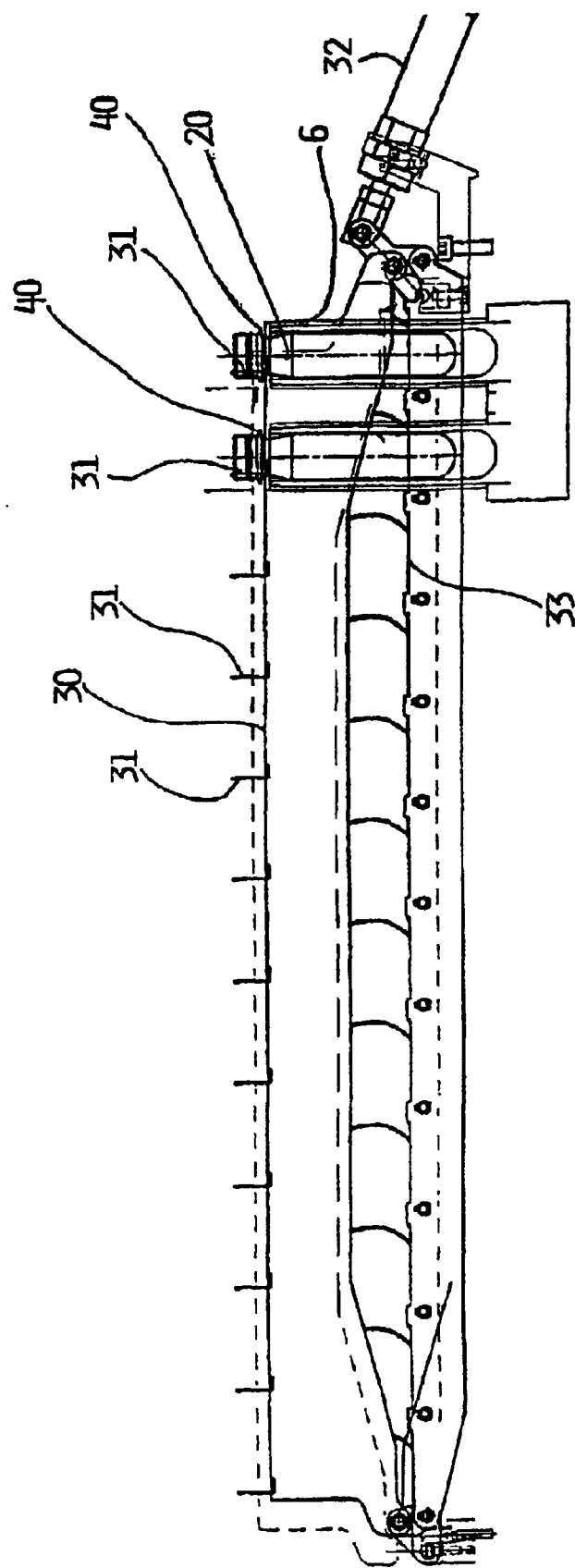
FIG. 24 is a view of the same device of FIG. 22 in a second operating state thereof.

Immediately thereafter, in order to firmly retain the preform in its correct, fully inserted position in the cup 6, the first plane 30 and the second plane 33 are rotated and, therefore, brought close to each other by acting on the pneumatic cylinder, so that the preform is able to get fully inserted by gravity into the respective cup, as shown in FIG. 24.

At the same time, as the two planes 30 and 33 move in such a manner relative to each other, the spring nails 31, which are integral with or firmly joined to the second plane 33, dispose themselves in such a manner as to come to lie upon the neck portion of the respective preforms so as to prevent them from accidentally or untimely falling down when turned upside down.

When the time then comes for the preforms, in said overturned position thereof, to be released from their respective cups, the pneumatic cylinder is operated in the reverse manner, so as:

to clear the preform falling trajectory by moving the related spring nail 31 away, and to release the preforms from the respective cups by means of the lever constituted by the first plane 30 that pushes the neck portions 40 of the related preforms outwardly.

Furthermore, there is provided an appropriate evacuation apparatus to produce the vacuum that is used to retain each single preform in its own cup up to the moment of the ejection thereof.

All these devices operate as follows: after the preforms fall down from the revolving turret into the respective cups, means as generally well-known in the art are used to generate a vacuum inside the cups occupied by the preforms. This vacuum then enables the same cups, and therefore the respective preforms, to be turned upside down without any risk for the same preforms to slide by gravity out of the respective cups and so fall down in advance of the due time.

In addition, the second plane 33 is actuated so as to move it into arranging its spring nails 31 in a position outside and in front of the aperture of the respective preforms, so that these preforms, should it accidentally happen that they fail to be retained by the generated vacuum when turned upside down, would in any case be retained from falling down by the spring nails 31.

At the pre-established moment, at which the by now cooled-down preforms are to be caused to fall down from the successive rows in the revolving turret, the pneumatic cylinder is operated so as to act on the afore mentioned two planes 30 and 33 with the twofold result that, on the one side, the spring nails move to a position on the side of the preforms, thereby clearing the falling trajectory thereof, and, on the other side, the first plane 30, by acting as a lever on the surface of the neck portion thereof, pushes the preforms out of the respective cups, from which they then fall down by gravity, thereby completing their ejection.

In order to facilitate such an ejection, the vacuum inside the cups of each row that is each time involved in this preform ejection operation is eliminated by injecting low-pressure air into the respective cups. Such an operation can, on the other hand, be most easily obtained through the use of means that are well-known in the art.

An advantageous improvement can be further obtained if the revolving turret is provided with the possibility for it to move upwards and/or downwards in a controlled manner. The necessity must in fact be considered for the outer surfaces of the turret, which must receive the preforms, to be able to be brought as close as possible to the respective receptacles of the element 2 so as to ensure an exact centering and insertion of the preforms themselves.

However, such proximity may in fact constitute a hindrance to the free rotation of the revolving turret, since the latter is quite likely to so interfere with the element 2 thereabove or, more simply, with the preforms that protude downwards from the element.

In view of doing away with such a drawback, appropriate means are therefore provided which, suitably connected to the axis of rotation of the turret, are adapted to cause it to rise or lower along the vertical in a controlled manner.

As synthetically illustrated in FIG. 1, these means may consist of an engagement element 42 rotatably joined to the rotating shaft of the revolving turret and capable of engaging a vertical worm screw 43 so as to be able to be actuated, upon appropriate command, so that the revolving turret can be raised and/or lowered in a manner that is fully independent of the remaining operations carried out by the plant.

In this manner it is possible for the revolving turret to be lowered immediately upon its having been loaded with the preforms from a distinct distribution pattern, so that it is possible for the same turret to be rotated even before the collection and translation element 2 is displaced from its unloading position above the turret to its loading position in the injection-moulding press. The operating cycles and, therefore, the working times of the revolving turret can in this way be fully disengaged from the operating cycles and working times of the element 2.

It is therefore possible for the individual operation cycles to be optimized and, in all productivity of the plant to be increased.

What is claimed is:

1. A plant for handling and cooling preforms produced in an injection mold as well as transferring the preforms to a subsequent work station, comprising:

a horizontally arranged collection and translation element provided with a plurality of receptacles adapted to accommodate a corresponding plurality of preforms from an injection mold; and a revolving turret element of a parallelepiped shape provided with several outer surfaces provided with a plurality of cups, each of said cups adapted to accommodate a respective preform, said revolving turret element being adapted to be rotated about a horizontal axis to successively orientate said several outer surfaces upwards and downwards;

wherein said collection and translation element is adapted to be selectively displaced between a preform loading position and a plurality of distinct positions lying vertically above said several outer surfaces when said outer surfaces are rotated upwards, said collection and translation element having means adapted to selectively retain and release the preforms in and from respective said receptacles.

2. The plant of claim 1, wherein:

said horizontally arranged collection and translation element is plane;

said collection and translation element is adapted to accommodate the plurality of preforms when ejected from the injection mold; and said collection and translation element is adapted to be displaced with translatory movement.

3. The plant of claim 1, wherein said collection and translation element has a distribution pattern of said receptacles identical to a distribution pattern of said plurality of cups of said outer surfaces so that the preforms can fall from said collection and translation element, when arranged in an appropriate position, into respective said cups in said distribution pattern of said outer surfaces.

4. The plant of claim 3, wherein at least one of said outer surfaces of said revolving turret comprises a plurality of distribution patterns comprising respective said cups, each of said distribution patterns:

corresponding to said distribution pattern of said receptacles in said collection and translation element; and is spatially and mutually distinct from the remaining of said distribution patterns on the same one of said outer surfaces of said revolving turret, all of said cups of said distribution patterns being arranged on said at least one of said outer surfaces without interference with each other.

5. The plant of claim 4, wherein said collection and translation element is adapted to be selectively displaced into a plurality of distinct positions such that in each of said positions the distribution pattern of the respective receptacles lies exactly above one of said distribution patterns of said cups so that preforms released from said receptacles are able to fall exactly into the respective said cups.

6. The plant of claim 5, wherein said revolving turret comprises retaining and releasing means adapted to selectively retain and release the preforms when inserted in said cups.

7. The plant of claim 1, wherein there are two said outer surfaces of said revolving turret provided at opposite parallel sides of said revolving turret, and said revolving turret is adapted to be selectively and successively rotated into the two opposite positions corresponding to the two said outer surfaces being alternately turned in the downward and upward positions.

8. The plant of claim 7, wherein:

said collection and translation element has a distribution pattern or said receptacles comprising a plurality of parallel and equidistant receptacle rows, each of said receptacle rows having the same number of said receptacles;

the two said outer surfaces of said revolving turret element are formed by a plurality of parallel cup rows of aligned cups, said parallel cup rows being contained within a rectangular perimeter, each of said cup rows having the same number of said cups; and a distance between one of said cup rows and adjacent parallel cup rows, belonging to a common distribution pattern, is such as to enable a plurality of further rows of cups to be inserted between them, each one of said further rows belonging to a respective distinct distribution pattern; and the same distribution patterns are arranged so as to mutually interpenetrate so that the cups belonging to distinct distribution patterns are positioned in a mutually alternating manner along at least a same one of said parallel cup rows.

9. The plant of claim 8, wherein the distribution patterns for each of the two of said outer surfaces are arranged such that said cups form an orthogonal grid with parallel adjacent cup rows that take up substantially the whole area of each said outer surface.

10. The plant of claim 1, wherein said means adapted to selectively retain and release the preforms in and from respective said receptacles comprises:

an upper plate fixed relative to said collection and translation element and having a plurality of apertures having a cross-section so as to allow an entire preform to pass through; and a lower plate having a plurality of apertures equal in number to said plurality of apertures of said upper plate, each of said plurality of apertures of said lower plate comprising a first portion having a cross-section so as to enable a preform body to pass through while blocking a preform neck portion from passing through and a second portion having a cross-section so as to enable the entire preform to pass through, said lower plate being slidable with respect to said upper plate.

11. The plate of claim 10, wherein said apertures of said upper plate are adapted to engage the neck portion of respective preforms.

12. The plant of claim 11, wherein an outer portion of said apertures of said upper plate is flared upwards.

13. The plant of claim 11, wherein:
said collection and translation element is slidably engaged with respect to a load-bearing structure, said revolving turret being provided so as to be capable of rotating inside said load-bearing structure;
an actuator firmly associated with respect to said load-bearing structure and adapted to act on said lower plate to cause said lower plate to slide with respect to said upper plate so that said apertures in said lower plate are able to move from a first position, in which the preform body, but not the preform neck portion, is inserted in said first portion of one of said apertures of said lower plate, to a second position, in which the same preform can pass in its entirety through said second portion of the one of said apertures of said lower plate.

14. The plant of claim 6, wherein said retaining and releasing means of said revolving turret comprises:
a plurality of first planes adapted to engage neck portions of respective preforms and at least partially remove the preforms from respective said cups;
a corresponding plurality of second planes provided with a plurality of apertures adapted to enable insertion of respective preforms in respective said cups; and
a plurality of obstructions capable of being selectively displaced against the preforms so as to prevent the preforms from sliding out of respective said cups.

15. The plant of claim 14, wherein;
said obstructions are connected to said second planes;
an actuator is provided to move said first and said second planes between a first position away from each other and a second position close to each other;
in said first position preforms are removed by neck portions thereof by said first planes and in said second position said obstructions are placed in front of mouths of respective preforms.

16. The plant of claim 1, and further comprising a means for selectively generating a vacuum inside said cups to retain the preforms therein when said cups are turned downwards by said revolving turret.

17. The plant of claim 1, and further comprising a means for selectively generating excess air pressure inside said cups to release the preforms therein when said cups are turned downwards by said revolving turret.

18. The plant of claim 1, wherein said revolving turret further comprises cooling conduits having a flow of refrigerant circulated there through to cool said cups.

19. The plant of claim 1, and further comprising a means for selectively raising and lowering said revolving turret by vertical translatory movement.

20. The plant of claim 1, and further comprising a raising and lowering mechanism for selectively raising and lowering said revolving turret by vertical translatory movement, said mechanism including an engagement member engaging a rotation shaft of said revolving turret and a rack associated with said engagement member.

* * * * *